United States Patent
Yu et al.

(10) Patent No.: US 6,442,137 B1
(45) Date of Patent: Aug. 27, 2002

(54) APPARATUS AND METHOD IN A NETWORK SWITCH FOR SWAPPING MEMORY ACCESS SLOTS BETWEEN GIGABIT PORT AND EXPANSION PORT

(75) Inventors: Ching Yu; Xiaohua Zhuang, both of Santa Clara; Bahadir Erimli, Campbell; John M. Chiang, San Jose; Shashank Merchant, Sunnyvale; Robert Williams, Cupertino; Edward Yang; Chandan Egbert, both of San Jose; Vallath Nandakumar, Campbell; Ian Lam, Daly City; Eric Tsin-Ho Leung, San Jose, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/317,143

(22) Filed: May 24, 1999

(51) Int. Cl.[7] .................................................. H04L 5/22
(52) U.S. Cl. ...................... 370/232; 370/468; 370/229; 370/429; 710/310; 710/311
(58) Field of Search ................................ 370/232, 235, 370/237, 347, 348, 376, 381, 382, 383, 442, 462, 468; 709/105, 213, 214, 215, 229, 233, 234, 235, 236; 711/150, 151, 147; 710/310, 311

(56) References Cited

U.S. PATENT DOCUMENTS

| | | | |
|---|---|---|---|
| 4,181,933 A | * | 1/1980 | Benysek ...................... 345/534 |
| 5,515,376 A | | 5/1996 | Murthy et al. |
| 6,052,738 A | * | 4/2000 | Muller et al. ................ 709/213 |
| 6,052,751 A | * | 4/2000 | Runaldue et al. ........... 710/100 |

* cited by examiner

Primary Examiner—Wellington Chin
Assistant Examiner—William Schultz (57) ABSTRACT

A network switch having switch ports for full-duplex communication of data packets with respective network nodes according to Ethernet (IEEE 802.3) protocol that allocates a prescribed number of external memory bandwidth slots between high data rate ports based on the compared amount of network traffic on the respective ports. A scheduler within an external memory interface initially assigns memory access slots to the respective high data rate ports according to a prescribed sequence. If the scheduler subsequently detects that the network data traffic on a port having less slots is higher than the traffic on a port having more slots, the slots are swapped between the high data rate ports. Additionally, a clock multiplexer in one of the high data rate ports adjusts the data rate of the port dependent upon the number of slots assigned to that port. The swapping of bandwidth slots between the high data rate ports along with the adjustment of the port clock rate enables the efficient use of limited memory bandwidth resources.

22 Claims, 8 Drawing Sheets

APPARATUS AND METHOD IN A NETWORK SWITCH FOR SWAPPING MEMORY ACCESS SLOTS BETWEEN GIGABIT PORT AND EXPANSION PORT

FIELD OF THE INVENTION

The present invention relates to networks and more particularly, to a system and method of controlling network traffic data in a full-duplex switched network operating according to Ethernet (IEEE 802.3) protocol.

BACKGROUND ART

Switched local area networks use a network switch for supplying data frames between network stations or other network nodes, where each network node is connected to the network switch by a media. The switched local area network architecture uses a media access control (MAC) enabling a network interface within each network node and the network switch to access the media. The network switch stores and forwards data frames received from a transmitter node to a destination node based on header information and the data in the received frames, including source and destination address. An external memory, such as an SSRAM, is used by the network switch to temporarily store the data frames as they are passed through the switch. In particular, the network switch stores and fetches data frames in the external memory via an external memory bus.

A difficulty in designing a network switch to be "non-blocking" (i.e., preventing delay in transferring a data packet received at an input switch), yet with limited memory bandwidth resources, is ensuring that each port of the network switch has sufficient memory resources allocated from the external memory to prevent the delay of data transmission. The external memory bus of an SSRAM, for example, has a limited bandwidth based on the number of data bits on the external memory bus (e.g., 16-bit, 32-bit, etc.) and the data rate of the bus. Hence, a network switch may allocate a fixed number of time slots for each port of the network switch. However, the data traffic on higher speed switch ports may exceed the bandwidth capacity of the external memory bus.

Previous switches have been proposed which assign memory slots to ports using a request based arbitration scheme that grants memory slots to ports requesting slots on a "first come, first serve" basis. As the slots are requested, an arbitrator grants slots in answer to the requests as they are received, but only after previously requested slots have been completed. The request based arbitration; scheme, however, is complex and difficult to implement, increasing the likelihood for errors. From an implementation standpoint, such arbitration schemes present more difficulty in controlling the memory allocation.

Other systems have included fixed slot schemes which assign a fixed amount of bandwidth to each slot of the network switch. However, these systems are expensive since sufficient bandwidth capacity must be provided to all of the slots at all times. Also, since ports are not fully utilized at all times, much of the assigned bandwidth is wasted due to times of inactivity on a network switch port.

SUMMARY OF THE INVENTION

There is a need for allocating limited memory bandwidth among network switch ports based on detected network traffic conditions on the network switch ports. In particular, there is a need for selectively reassigning memory slots between high data rate ports of a network switch to optimize use of limited bandwidth resources in a non-blocking switch.

There is also a need to minimize the use of complex arbitration schemes by controlling memory slot allocation using easier to implement arrangements.

These and other needs are attained by the present invention, where the limited memory bandwidth slots are selectively reassigned between high data rate ports dependent upon which ports are encountering higher network traffic to achieve efficient and inexpensive allocation of the memory bandwidth resources.

According to one aspect of the invention, a network switch includes a first port having an initially assigned first number of memory access slots and a second port having an initially assigned second number of memory access slots less than the first number of memory access slots. In addition, the network switch includes an external memory interface configured for transferring packet data at a prescribed data rate between the network switch and an external memory. The external memory interface includes a scheduler that assigns the initially allocated first and second numbers of memory access slots of the first and second ports, respectively. Furthermore, the scheduler selectively reassigns the first number of memory access slots to the second port and the second number of memory access slots to the first port based on the first port encountering less network traffic relative to the second port. The feature of the scheduler selectively reassigning or, in other words, selectively "swapping" the memory access slots assigned to the high data rate ports, allows the present invention to efficiently allocate limited memory bandwidth resources while achieving an inexpensive and easily implemented network switch.

Additionally, the second port includes a clock mutliplexer configured for selectively changing a data rate (i.e., the rate at which the port transmits and receives data externally over a media) of the second port based on the number of assigned memory slots assigned to the first and second ports. This feature prevents overflow and underflow conditions in the second port which may occur as the allocated bandwidth of the second port varies according to the reassignment of memory access slots.

According to another aspect of the invention, a method assigns memory access slots between first and second ports of a network switch having an external memory interface configured for transferring packet data to an external memory, the external memory interface including a scheduler for assigning memory access slots. The method includes assigning an initial first and second number of memory access slots to the first and second ports, respectively, the second number of memory access slots being less than the first number of memory access slots. Next, the scheduler determines whether the first port is encountering less network traffic relative to the second port. The first number of memory access slots are selectively reassigned to the second port and the second number of memory access slots are selectively reassigned to the first port based on a determination that the first port encountering less network traffic relative to the second port. The selective reassignment of memory access slots by swapping the assignments eliminates the need for complex arbitration schemes and, hence, allows the present invention to inexpensively and easily implement efficient allocation of limited memory bandwidth resources.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 3 comprised of FIGS. 3A–C is a block diagram illustrating in detail the switching subsystem of FIG. 2.

DESCRIPTION OF THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
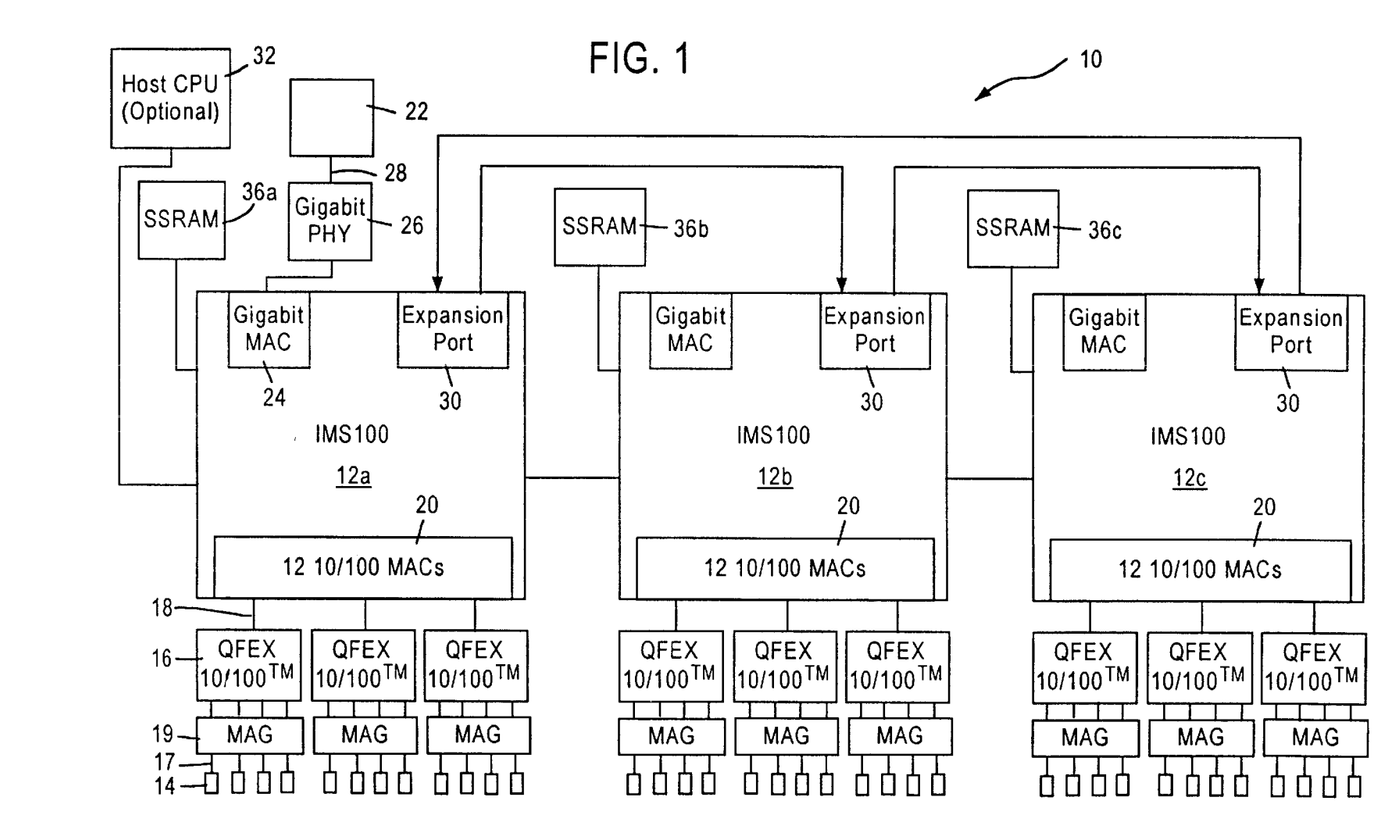
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
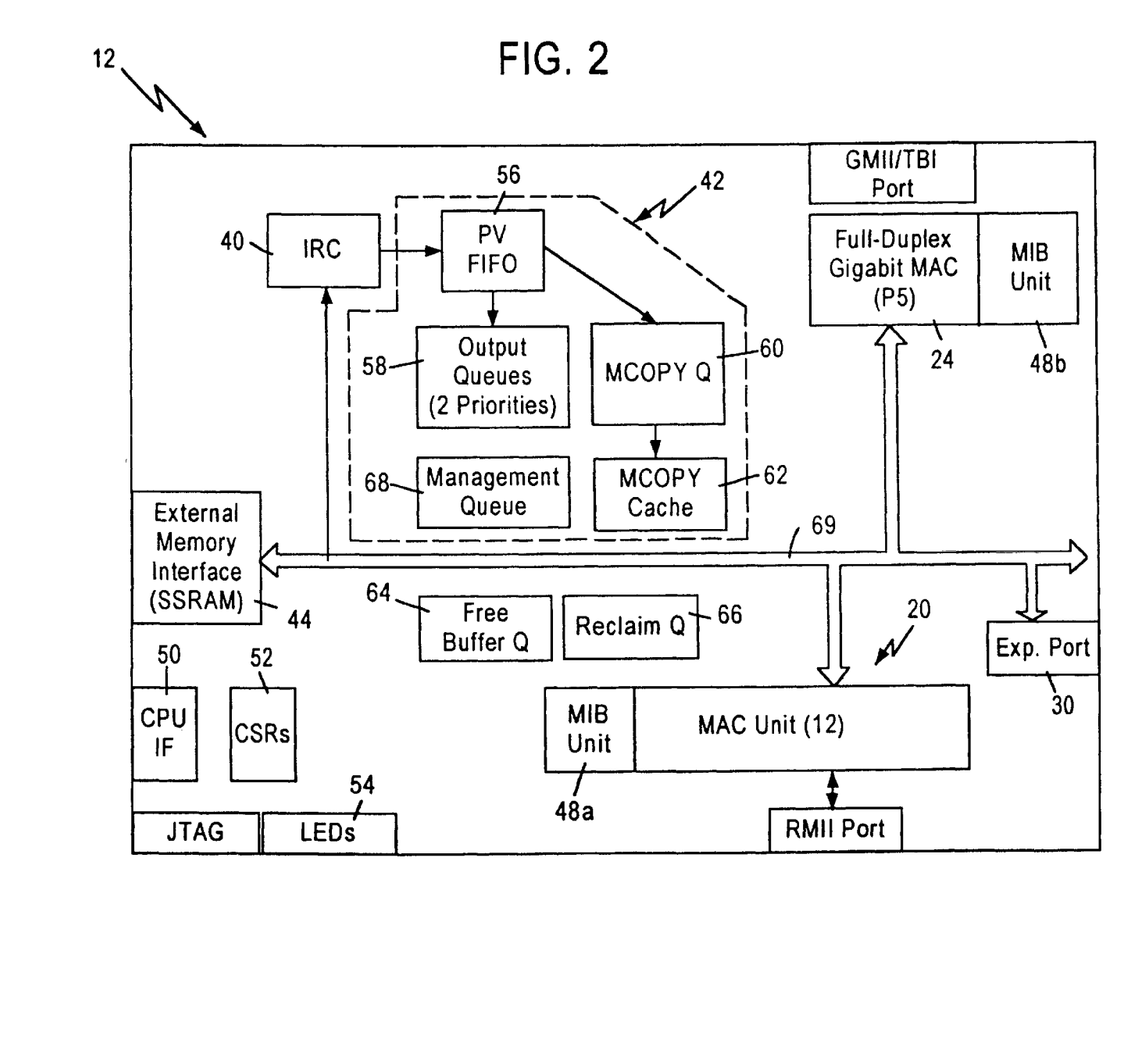
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a how CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figures 3, 3A:
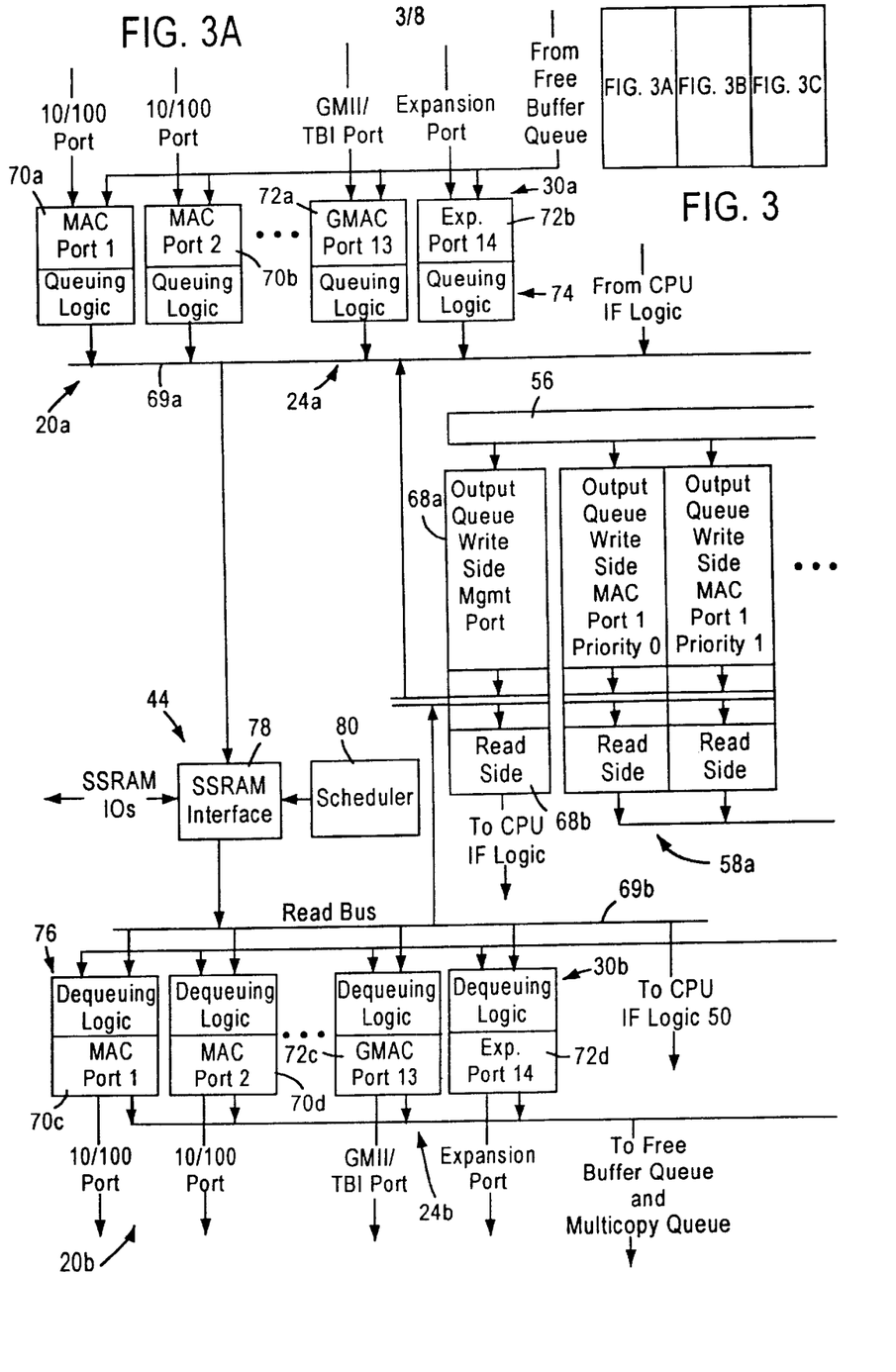
Figure 3B:
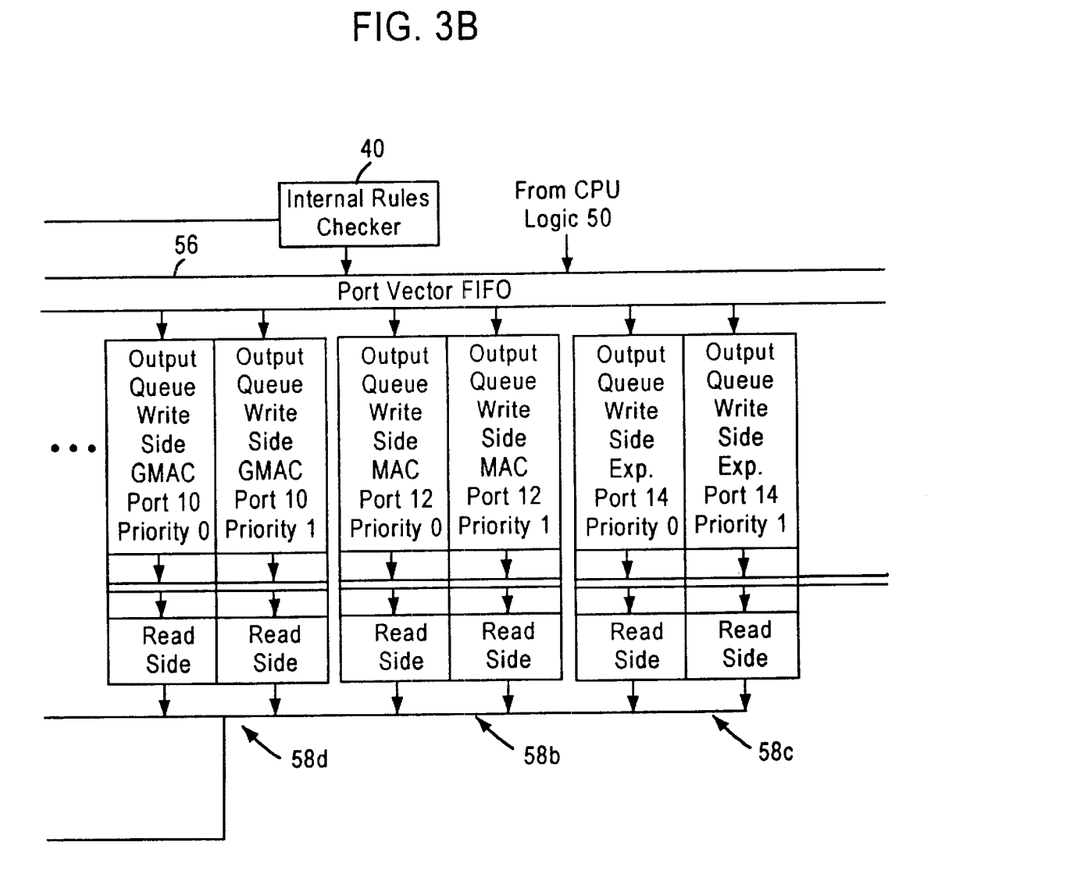
Figure 3C:
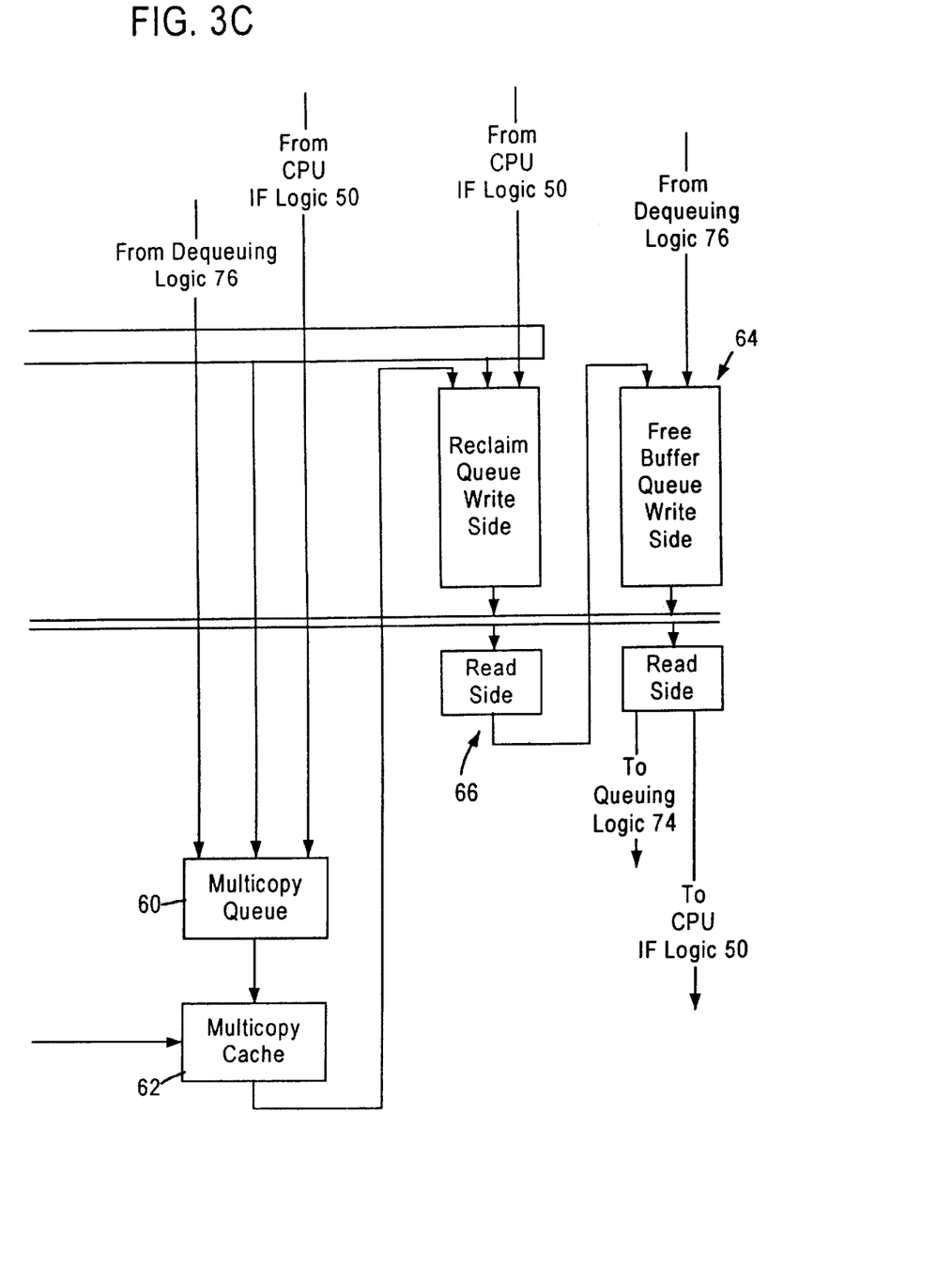

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70*a*, 70*b*, 72*a*, and 72*b* include queuing logic 74 for transfer of received data from the corresponding internal receive FIFO to the external memory 36 and the rules checker 40. Each of the transmit MAC modules 70*c*, 70*d*, 72*c*, and 72*d* includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer, specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69*a* from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69*a*. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70*c*, 70*d*, 72*d*, and 72*c* has an associated output queue 58*a*, 58*b*, 58*c*, and 58*d*, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58*d* for the gigabit transmit MAC 72*c*. The dequeuing logic 76 for the transmit gigabit port 24*b* takes the frame pointer from the corresponding gigabit port output queue 58*d*, and issues a request to the scheduler 80 to read the frame data from the external memory 36 at the memory location specified by the frame pointer. The scheduler 80 schedules the request, and issues a grant for the dequeuing logic 76 of the transmit gigabit port 24*b* to initiate a DMA read. In response to the grant, the dequeuing logic 76 reads the frame data (along the read bus 69*b*) in a DMA transaction from the location in external memory 36 pointed to by the frame pointer, and stores the frame data in the internal transmit FIFO for transmission by the transmit gigabit MAC 72*c*. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20*b*, 24*b*, and/or 30*b*.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the network switch 12 will now be provided.

Memory Access Slot Swapping

As part of an embodiment of the present invention, the scheduler 80 as part of the external memory interface 44, is configured for responding to port requests for bandwidth and granting the requesting ports memory access slots to access the SSRAM 36. In this particular embodiment, the SSRAM 36 preferably has a 64-bit wide data path with a 100 Mb/s clock equaling a maximum 6.4 Gigabit throughput (minus a few cycles for read-write turnaround). The present implementation of 12–100 Mb/s full-duplex ports plus a full-duplex Gigabit port 24 and an approximately 1.2 Gb/s Expansion port 30 exceeds the bandwidth capacity for accesses to the SSRAM 36.

According to the disclosed embodiment, the scheduler 80 selectively allocates the memory access slots based on the detected data traffic on the Gigabit port 24 and the Expansion port 30. In particular, the scheduler 80 selectively reassigns a first number of memory access slots initially assigned to the Gigabit port 24 to the Expansion port 30 and a second number of memory access slots initially assigned to the Expansion port 30 to the Gigabit port 24 based on the Gigabit port 24 encountering less network traffic relative to the Expansion port 30.

In the present embodiment, the scheduler 80 assigns each of the 10/100 Mb/s modules in the MAC 20 a fixed grant of bandwidth slots. Hence, no request for bandwidth is necessary from these modules to the scheduler 80. The Gigabit port 24 and the Expansion port 30 share a combined bandwidth pool of slots. In the allocation of the pooled bandwidth slots, the scheduler 80 assigns the Gigabit port 24 and Expansion port 30 a respective initial number of slots from the bandwidth pool. Preferably, the scheduler 80 initially assigns enough slots to the Gigabit port 24 to accommodate the entire bandwidth capacity of the Gigabit port 24 (i.e., 2 Gb/s) in full-duplex operation since the Gigabit port 24 will typically encounter more network traffic than the Expansion port 30. The remaining number of memory access slots in the bandwidth pool are assigned by the scheduler 80 to the Expansion port 30.

However, when the network switch 12 is connected in a cascade arrangement through the Expansion port 30, the Expansion port 30 requires increased bandwidth capacity. Hence, scheduler 80 reassigns (e.g., "swaps") the initially assigned time slots of the Gigabit port 24 and the Expansion port 30 based on detecting that the Expansion port 30 encounters more network data traffic than the Gigabit port 24. In other words, the scheduler 80 selectively reassigns the slots initially assigned to the Gigabit port 24 to the Expansion port 30 and the slots initially assigned to the Expansion port 30 to the Gigabit port 24.

Take an example where 13 slots are available in the bandwidth pool. If the Gigabit port 24 is typically encountering more network traffic data than the Expansion port 30, the scheduler 80 initially assigns 10 memory access slots to the Gigabit port 24 and the remaining 3 slots to the Expansion port 30. If the network switch 12 is cascaded with one or more other network switches through the Expansion port 30, for example switch 12b or 12c of FIG. 1, more memory access slots are required for the Expansion port 30. Hence, the scheduler 80 reassigns or "swaps" the slots such that the Expansion port 30 receives the 10 slots initially assigned to the Gigabit port 24 and the Gigabit port 24 receives the three slots initially assigned to the Expansion port 30.

Figure 4:
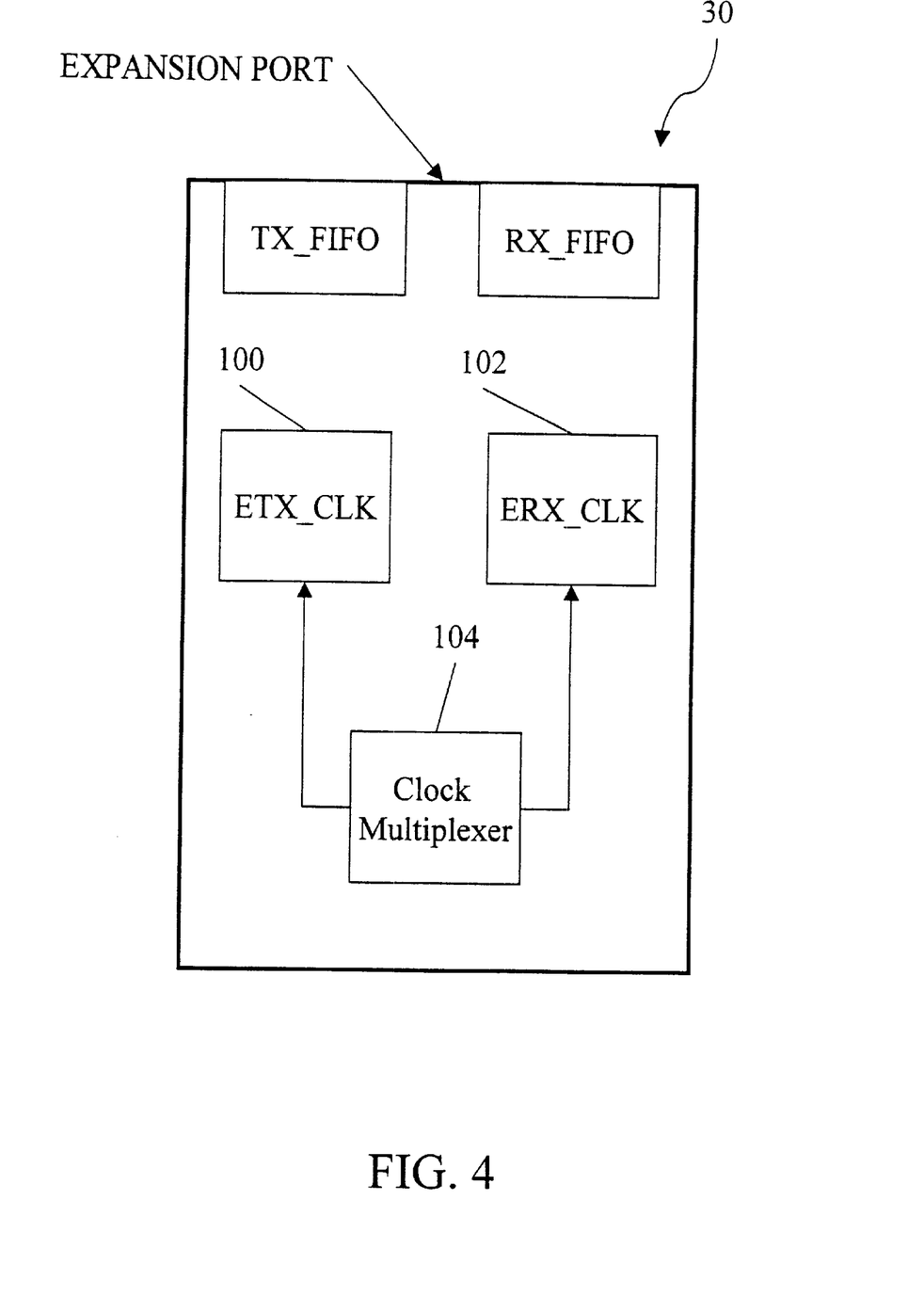
FIG. 4 is a block diagram illustrating in detail the Expansion port of FIG. 2.

As shown in FIG. 4, the Expansion port 30 of the present invention includes a transmit clock ETX_CLK 100, a receive clock ERX_CLK 102 and a clock multiplexer 104 for "scaling" (i.e., adjusting the rate of) the transmit and receive clocks. The multiplexer 104 scales the clocks 100 and 102 to ensure that the data rate on the link between Expansion ports of cascaded network switches (See FIG. 1) may accommodate the assigned number of slots without creating overflow or underflow problems. That is, as the number of memory access slots assigned to Expansion port 30 changes, the rate at which data may be transferred without the occurrence of "blocking" between the SSRAM and Expansion port 30 varies accordingly. Hence, the data rate of the Expansion port 30 in the present invention is controlled to ensure that the rate of data transfer between the Expansion port 30 and the SSRAM prevents blocking in the network switch 12. When the number of memory access slots assigned to the Expansion port 30 is decreased (and the number of memory access slots assigned to the Gigabit 24 increases, accordingly), the data rate is scaled down to accommodate the decreased data transfer rate and to prevent a data overflow. Additionally, in the case where multiple network switches are cascaded, the expansion ports of all the network switches preferably should operate at the same data rate to prevent overflow and underflow conditions. Hence, a synchronizing signal is sent over the link from the first network switch (e.g., 12a in FIG. 1) to the clock multiplexers in the expansion ports of the other network switches (12b and 12c) to synchronize the data rates of the expansion ports.

Using the previous example, if the Expansion port 30 is assigned three (3) memory access slots by the scheduler 80, the clock multiplexer 104 scales the rate of the clocks 100 and 102 to 30 MHz to avoid overflow problems. On the other hand, if the scheduler 80 determines that Expansion port 30 connected to expansion ports in other network switches has more data traffic than the Gigabit port 24, the scheduler "swaps" the slot assignments between the Gigabit port 24 and Expansion port 30 such that the Expansion port 30 is assigned 10 memory slots. In this case, the clock multiplexer 104 scales the rates of clocks 100 and 102 from 30 MHz to 100 MHz to accommodate the increased data capacity.

According to the disclosed embodiment, each data packet contains a common control bit which is read by the Expansion port 30 to determine the clock multiplexer 104 setting. This common control bit is set by the scheduler 80 and is based upon the scheduler determining whether the Gigabit port 24 is encountering more or less network traffic than the Expansion port 30.

Figure 5:
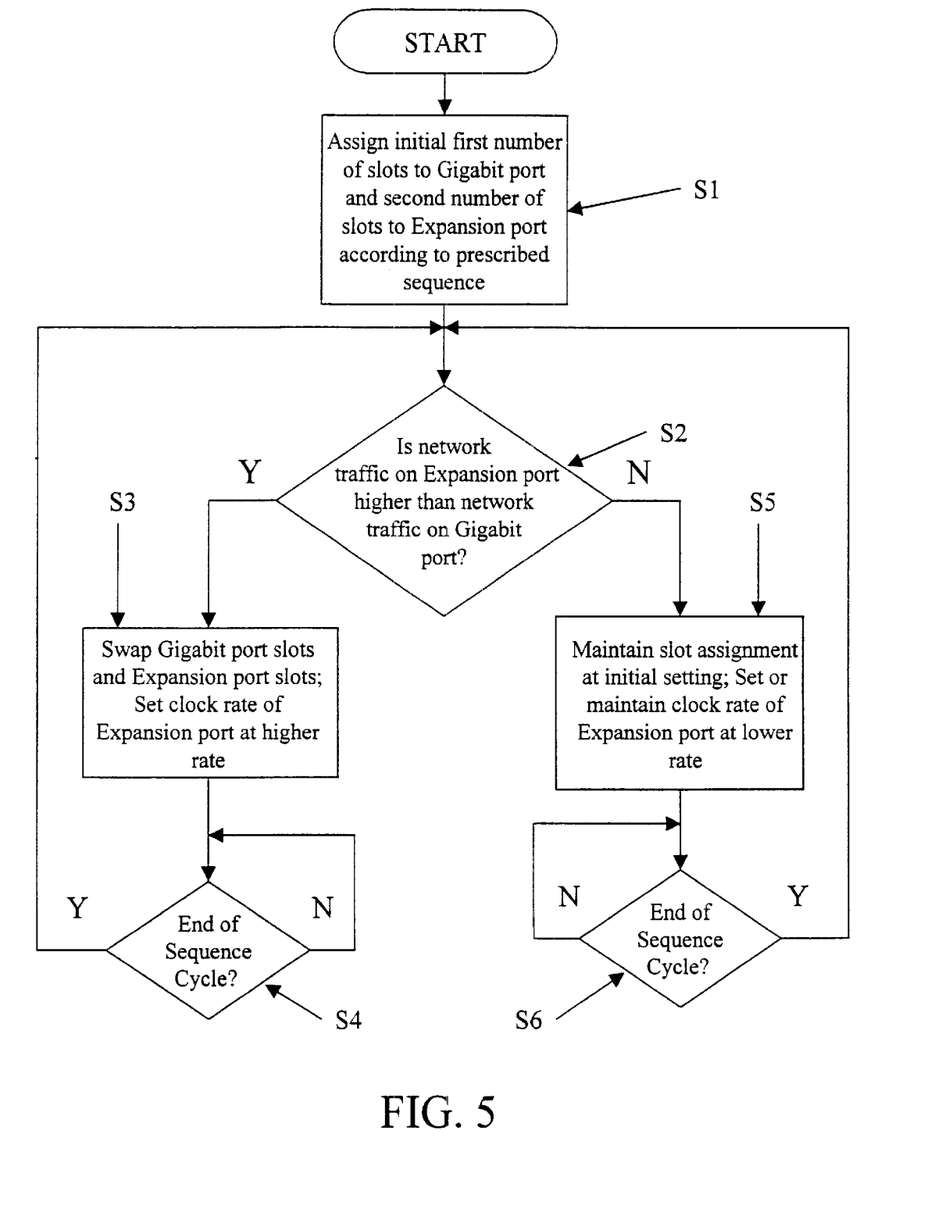
FIG. 5 is a flow diagram illustrating the method of selectively assigning memory access slots according to an embodiment of the present invention.
Figure 6:
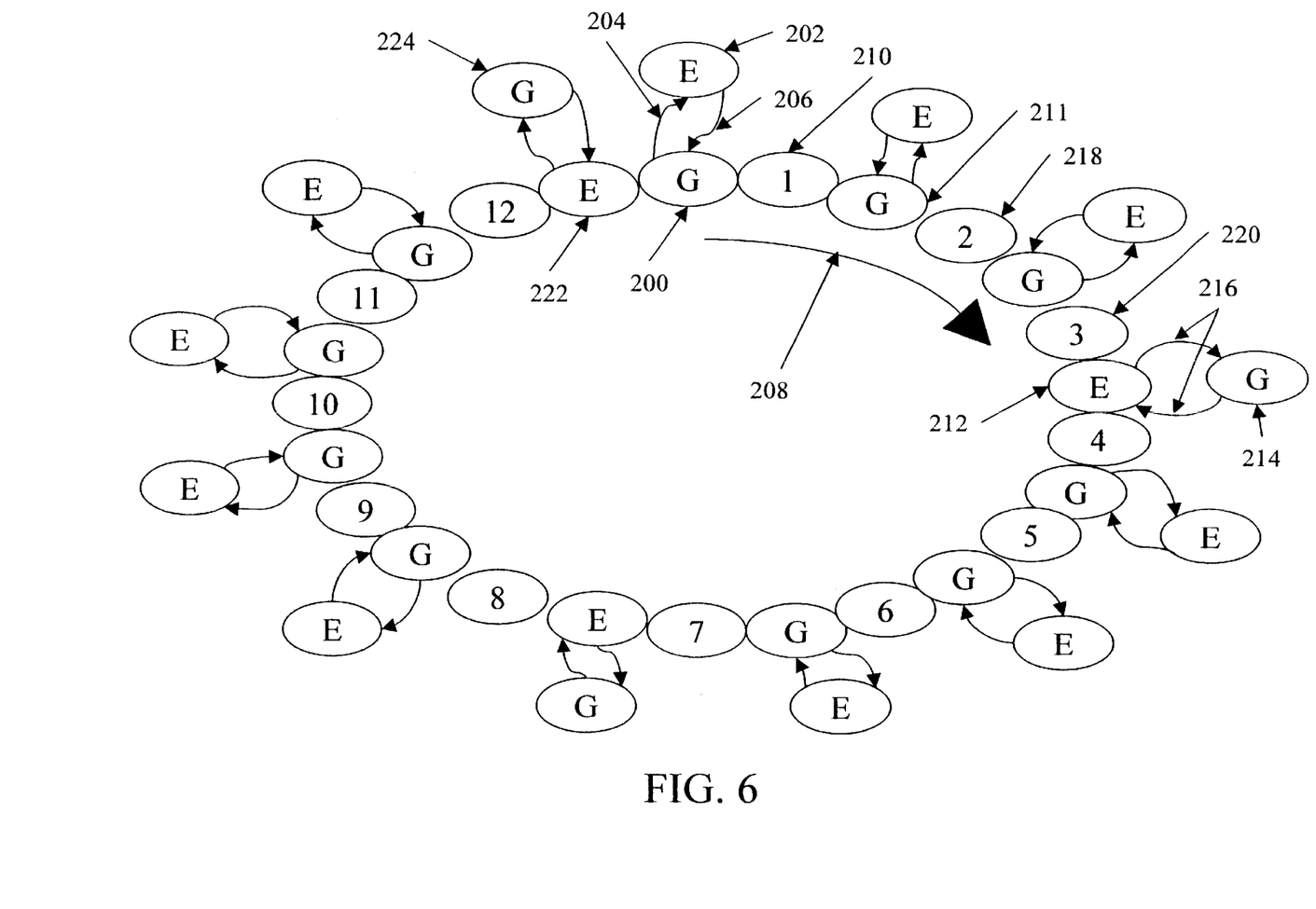
FIG. 6 is a diagram illustrating a sequence of memory access slots generated by the scheduler of FIG. 3 according to an embodiment of the present invention.

FIG. 5 is a flow diagram illustrating the method by which memory slots are assigned by the scheduler 80 between the Gigabit port 24 and the Expansion port 30 according to an embodiment of the present invention. In step S1, the scheduler 80 initially assigns a first number of memory access slots to the Gigabit port 24 and a second number of memory access slots to the Expansion port 30. The scheduler 80 assigns slots to each of the network switch ports according to prescribed repeating sequence as exemplified in FIG. 6. In the exemplary embodiment of FIG. 6, an initial assignment sequence is given as:

G 1 G 2 G 3 E 4 G 5 G 6 G 7 E 8 G 9 G 10 G 11 G 12 G 12 E where "G" represents a slot assigned to the Gigabit port 24, "E" represents a slot assigned to the Expansion port 30, and numbers 1–12 represent slots assigned to the 12–100 Mb/s ports within the MAC 12, respectively. Hence, the scheduler assigns one slot to each of the 100 Mb/s ports, ten slots to the Gigabit port 24 and three slots to the Expansion port 30 during an initial sequence cycle. The initial assignment sequence is shown by the "oval" shaped slot assignment ring and advances counter-clockwise around the ring as indicated by arrow 208.

The assignment sequence starts as the scheduler 80 assigns the Gigabit port 24 a memory access slot 200. Next, the scheduler advances the sequence and assigns a slot 210 to the first 10/100 port. The next assignments made by scheduler are slot 211 to the Gigabit port 24 and slot 218 to the second 10/100 port. FIG. 6 shows that the Expansion port 30 receives a slot assignment 212 after the scheduler 80 has assigned three slots to the Gigabit port and respective slots to the first three 10/100 ports. In addition, the scheduler 80 interleaves the assignment of slots to either the Gigabit port 24 or Expansion port 30 with the assignment of slots to the twelve 10/100 ports (i.e., 1–12) as can be seen in FIG. 6. The sequence proceeds until the last slot 222 in the sequence cycle has been assigned to the Expansion port 30. At this point, the scheduler 80 repeats the sequence, starting a new cycle at slot 200.

During the progression of a sequence cycle, the scheduler 80 also determines the amount of network traffic encountered by the Gigabit port 24 and the Expansion port 30 and compares the respective amounts at step S2. If the scheduler 80 determines that the Expansion port 30 is encountering more network traffic than the Gigabit port 24, the method proceeds to step S3. In step S3, the scheduler 80 reassigns all of the memory access slots initially assigned to the Gigabit port 24 to the Expansion port 30. For example, FIG. 6 illustrates that the scheduler 80 replaces the initial "G" assignment of slot 200 to the Gigabit port 24 with an "E" designation 202 by reassigning the slot to the Expansion port 30. As shown by arrows 204 and 206, the scheduler 80 reassigns or "swaps" the "G" designated slot 200 with an "E" assignment 202. Similarly, the scheduler 80 also reassigns the memory access slots initially assigned to the Expansion port 30 to the Gigabit port 24 as indicated, for example, by arrows 216. After the scheduler 80 swaps the Gigabit port and Expansion port slots, the sequence of FIG. 6 becomes:

E 1 E 2 E 3 G 4 E 5 E 6 E 7 6 8 E 9 E 10 E 11 E 12 G.

The scheduler 80 advances through the entire sequence cycle (Step S4) before returning to the step of determining and comparing the amount of network traffic (Step S2).

As discussed previously, when the scheduler Expansion port 30 receives a larger number of memory access slots, the data rate of the port can be increased to accommodate the larger data rate capacity. Hence, the scheduler 80 also signals the clock multiplexer 104 to increase the data rate of the Expansion port 30 in step S3.

If the scheduler 80 determines in step S2 the Gigabit port 24 is encountering more network traffic than the Expansion port 30, the method proceeds to step S5. At step S5, the scheduler 80 maintains the initial memory access slot assignment (e.g., 10 slots to the Gigabit port and 3 slot to the Expansion port). In addition, the scheduler 80 ensures that the clock multiplexer 104 either maintains or sets the data rate of the Expansion port 30 at a lower data rate commensurate with the lower number of assigned memory access slots. The scheduler 80 then advances through the entire sequence cycle (Step S6) before returning to the step of determining and comparing the amount of network traffic (Step S2).

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the amended claims.

What is claimed is:

1. A network switch comprising:
a first port having an initially assigned first number of memory access slots and a second port having an initially assigned second number of memory access slots less than the first number of memory access slots; and
an external memory interface configured for transferring packet data at a prescribed data rate between the network switch and an external memory, the external memory interface having a scheduler that assigns the initially assigned first and second numbers of memory access slots of the first and second ports, respectively, the scheduler selectively reassigning the first number of memory access slots to the second port and the second number of memory access slots to the first port based on the first port encountering less network traffic relative to the second port.

2. The network switch according to claim 1, wherein the second port comprises a clock multiplexer configured for selectively changing a data rate for the second port based on the corresponding number of memory access slots assigned to the second port.

3. The network switch according to claim 2, wherein the clock multiplexer selectively increases the data rate of the second port in response to the scheduler assigning the first number of memory access slots to the second port.

4. The network switch according to claim 3, wherein the scheduler causes the clock multiplexer to increase the data rate of the second port based on the first port encountering less traffic relative to the second port.

5. The network switch according to claim 1, wherein the second port is an expansion port configured for connecting the network switch to a second network switch.

6. The network switch according to claim 1, wherein the first port has a data rate of 1 Gigabit per second.

7. The network switch according to claim 1, wherein the second port has a data rate of about 1.2 Gigabits per second.

8. A network switch comprising:
a first port having an initially assigned first number of memory access slots;
a second port having an initially assigned second number of memory access slots less than the first number of memory access slots, the second port including a clock multiplexer configured for selectively changing a data rate of the second port; and
an external memory interface configured for transferring packet data at a prescribed rate between the network switch and an external memory, the external memory interface having a scheduler that selectively reassigns the first number of memory access slots to the second port and the second number of memory access slots to the first port based on network traffic on the second port exceeding a prescribed amount.

9. The network switch according to claim 8, wherein the clock multiplexer changes the data rate of the second port based on the number of slots assigned to the second port.

10. The network switch according to claim 8, wherein the clock multiplexer selectively increases the data rate of the second port in response to the scheduler assigning the first number of memory access slots to the second port.

11. The network switch according to claim 8, wherein the clock multiplexer changes the data rate of the second port based on the first port encountering less traffic relative to the second port.

12. The network switch according to claim 8, wherein the second port is an expansion port configured for connecting the network switch to a second network switch.

13. The network switch according to claim 8, wherein the first port has a data rate of 1 Gigabit per second.

14. The network switch according to claim 8, wherein the second port has a data rate of about 1.2 Gigabits per second.

15. A method of assigning memory access slots between first and second ports of a network switch having an external memory interface configured for transferring packet data to an external memory, the external memory interface including a scheduler for assigning memory access slots, the method comprising:

assigning an initial first and second number of memory access slots to the first and second ports, respectively, the second number of memory access slots being less than the first number of memory access slots;

determining whether the first port is encountering less network traffic relative to the second port;

selectively reassigning the first number of memory access slots to the second port and the second number of memory access slots to the first port based on a determination of the first port encountering less network traffic relative to the second port.

16. The method according to claim 15, further comprising:

setting a data rate of the second port is based on the number of slots assigned to the second port.

17. The method according to claim 16, further comprising:

setting the data rate of the second port with a clock multiplexer contained within the second port.

18. The method according to claim 17, further comprising:

setting the data rate of the second port with the clock multiplexer based on the first port encountering less traffic relative to the second port.

19. The method according to claim 16, further comprising:

increasing the data rate of the second port in response to the scheduler assigning the second number of slots to the first port.

20. The method according to claim 15, wherein the second port is an expansion port configured for connecting the network switch to a second network switch.

21. The method according to claim 15, further comprising:

assigning memory access slots according to a repeating sequence having a cycle length of a prescribed number of slots.

22. The method according to claim 21, further comprising:

repeating the step of determining whether the first port is encountering less network traffic relative to the second port is only after a sequence cycle is completed.

* * * * *